Feb. 9, 1971 C. B. CAPERTON 3,561,034
SEWER RODDING MACHINE
Original Filed Dec. 30, 1966 9 Sheets-Sheet 1

FIG_1_

INVENTOR.
Charles B. Caperton,

Feb. 9, 1971 C. B. CAPERTON 3,561,034
SEWER RODDING MACHINE
Original Filed Dec. 30, 1966 9 Sheets-Sheet 3

INVENTOR.
Charles B. Caperton,

Feb. 9, 1971  C. B. CAPERTON  3,561,034
SEWER RODDING MACHINE
Original Filed Dec. 30, 1966  9 Sheets-Sheet 4

INVENTOR.
Charles B. Caperton,

Feb. 9, 1971 C. B. CAPERTON 3,561,034
SEWER RODDING MACHINE
Original Filed Dec. 30, 1966 9 Sheets-Sheet 7

INVENTOR.
Charles B. Caperton,

INVENTOR.
CHARLES B. CAPERTON

United States Patent Office
3,561,034
Patented Feb. 9, 1971

1

3,561,034
SEWER RODDING MACHINE
Charles B. Caperton, Montgomery Court Apts.,
Narberth, Pa. 19072
Original application Dec. 30, 1966, Ser. No. 613,703, now Patent No. 3,469,273, dated Sept. 30, 1969. Divided and this application Apr. 4, 1969, Ser. No. 835,278
Int. Cl. B08b 9/02
U.S. Cl. 15—104.3          4 Claims

ABSTRACT OF THE DISCLOSURE

A drive for a sewer rodding machine includes a torsion-taking wheel for preventing the twist of the rod from getting back into the storage reel. A fixed guard functions to confine the rod on the periphery of the wheel. Cross rollers in the guard facilitate movement of the rod in its axial direction while preventing movement of the rod in the radial direction of the wheel.

This application is a division of application Ser. No. 613,703, filed Dec. 30, 1966, now U.S. Pat. 3,469,273, by Charles B. Caperton for sewer rodding machine.

This application is a continuation-in-part of my earlier filed copending application, Ser. No. 549,762, filed Apr. 22, 1966, now abandoned, entitled "Sewer Rodding Machine," which was a continuation-in-part of my still earlier application, Ser. No. 506,298, filed Nov. 4, 1965, now abandoned, entitled "Sewer Rodding Machine."

This invention relates to rodding equipment of the type used in the cleaning and maintenance of sewer pipes, water pipes, and other underground conduits and structures.

Sewer pipes, water pipes and the like are customarily cleared of obstructions by feeding into the pipe steel rod having at its foremost extremity a suitable tool for performing the particular cutting or clearing operation. Such tool may, for example, be an auger bit, a root saw, a centrifugal cutter, a pickup, or any other of a large variety of tools especially adapted for the purpose.

The point of obstruction in the pipe may, of course, be far removed from the point of entry into the pipe, and, accordingly, the tool may be at the foremost end of a rod whose length may be of the order of 900–1000 feet. In some cases, such long length of rod is a continuous piece, but in other cases the rod is comprised of a string of individual solid rods of ¼"–⅜" spring steel stock, each rod being about 39" long, the rods being coupled together by suitable couplings. For storing such long lengths of steel rod, either continuous or coupled, when not in use, or for transporting such rod to another work location, reels have been developed capable of holding 900–1000 feet of rodding. Such reels are designed to confine the rodding in coils or loops of large diameter in order to avoid bending the rod into a permanent set.

It is, of course, necessary to push the tool into the pipe, and to withdraw the tool from the pipe, and for these purposes a power drive is provided to move the rodding in its lengthwise directions. In order for the tool, particularly a cutting tool, to be effective, it is necessary for the rodding to be rotated axially, and a power drive for this purpose is also provided. If, as the rotating tool progresses forwardly into the pipe an obstruction is encountered, such obstruction will oppose rotation of the tool and the speed of rotation of the tool will be slowed down. A torsional stress is then imposed on the rodding and a twist will run back along the rod which, unless prevented, will run all the way into the coiled rodding in the storage reel. This tends to distort the loops of stored rodding and to cause entanglement thereof.

2

It is an object of my present invention to provide a sewer rodding machine having twist-barrier means for isolating, or substantially isolating, the storage reel from the torsional stress and twisting forces which tend to be set up in the rodding as the rodding is driven rotationally into the obstruction in the sewer or other pipe.

It is a further object to provide twist-barrier or isolating means as aforesaid for either continuous or coupled rodding.

In the specification which follows, and also in the claims, the rod, which may be continuous or which may be sectional, i.e., formed of a plurality of individual rods coupled together by couplers, is sometimes referred to as rodding and other times as rod.

The foregoing objects are achieved, in accordance wtih my present invention, by providing a torsion-taking annular surface near the storage reel, and guide means for guiding the rod to and confining means for confining the rod on, the annular surface as it passes out from or back into the storage reel.

My invention will be clearly understood from a consideration of the following detailed description of several embodiments selected for illustration in the drawings, in which.

Figure 1:
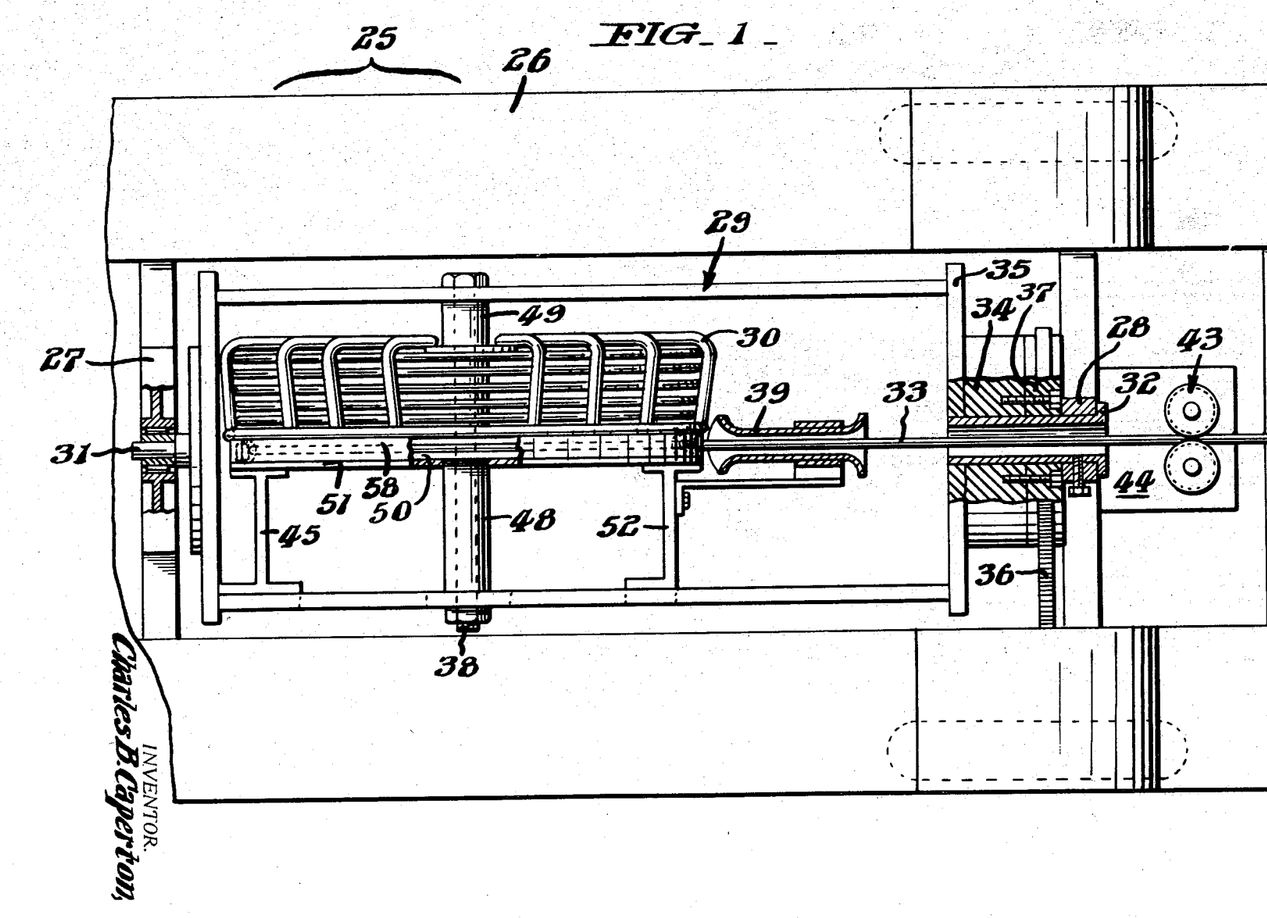
FIG. 1 is a plan view, partly broken away, of one form of rodding machine employing a torsion-taking wheel in accordance with the present invention.
Figure 2:
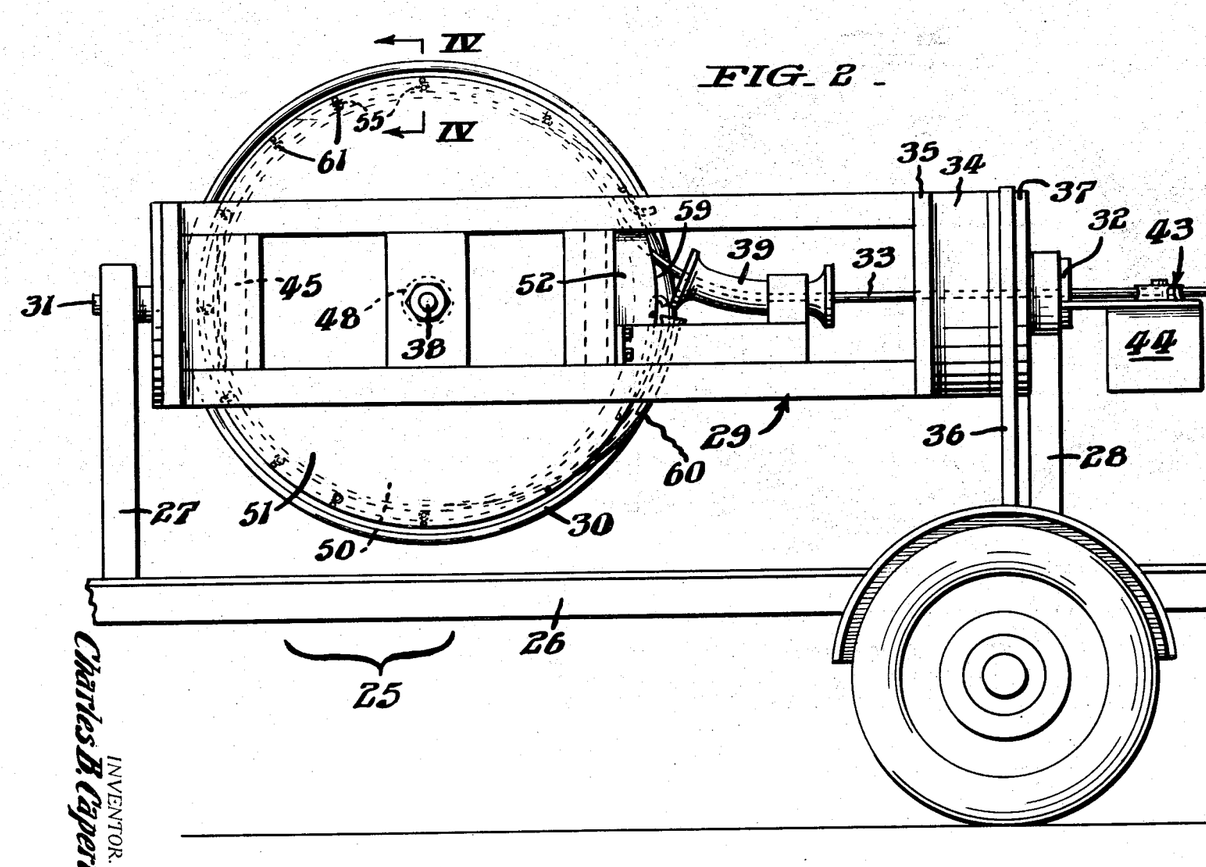
FIG. 2 is a side elevation, partly broken away, of the rodding machine of FIG. 1.

Referring now to FIGS. 1 and 2, there is illustrated a rodding machine embodying one form of my invention. The machine is shown to comprise a mobile unit 25 having a base member 26, and at each end thereof a vertical support member 27 and 28 for supporting for rotation therebetween a frame 29 which carries the rodding reel 30 and the torsion-taking wheel 50.

Frame 29 is supported at one end by the trunnion 31 and at the other end by an elongated hollow cylindrical tube 32 through which the continuous rodding 33 passes. Mounted on tube 32 for rotation thereabout is a drum 34, the inward side of which is secured to the end member 35 of the rotatable frame 29. Secured to drum 34 is a sheave 37 for receiving the V-belt 36 for driving rotationally the drum 34 and the frame 29.

Mounted in front of support member 28 is a known form of roller friction drive 43 for pulling the continuous rodding 33 out of the storage reel 30 and driving it forwardly into the sewer or other pipe to be cleared. The roller drive 43 is driven by power means 44, which may be either electric or hydraulic, and which is reversible. When driven in the reverse direction, the drive 43, 44 withdraws the rodding 33 from the sewer and returns it to the storage reel 30. In a known form of drive for continuous rodding, the drive rotates about the axis of the rodding when the rodding is rotated by the rotating frame 29 and the storage reel 30 carried thereby.

Storage reel 30 is mounted for free rotation on a sleeve 49 positioned at one end of a fixed cross shaft 38 secured to the frame 29. A second sleeve 48 positioned at the other end of cross shaft 38 has secured thereto for free rotation a torsion-taking wheel 50. Wheel 50 is mounted on sleeve 48 at the inward end thereof, adjacent the open face of storage reel 30 in a plane substantially parallel to that of the open end face of the reel.

Supported, as by brackets 45 and 52 fixed to the frame 29, is a cover guard 51, adjacent the torsion-taking wheel 50. It is to be noted that while the wheel 50 is free to rotate with sleeve 48 on the fixed cross shaft 38, the guard 51 is fixed to frame 29 and not free to rotate on shaft 38.

It is also to be noted that while the torsion-taking wheel 50 is physically located adjacent the storage reel 30, there is no fixed connection between the reel and the wheel, the only connection therebetween being the rodding 33.

Figure 3:
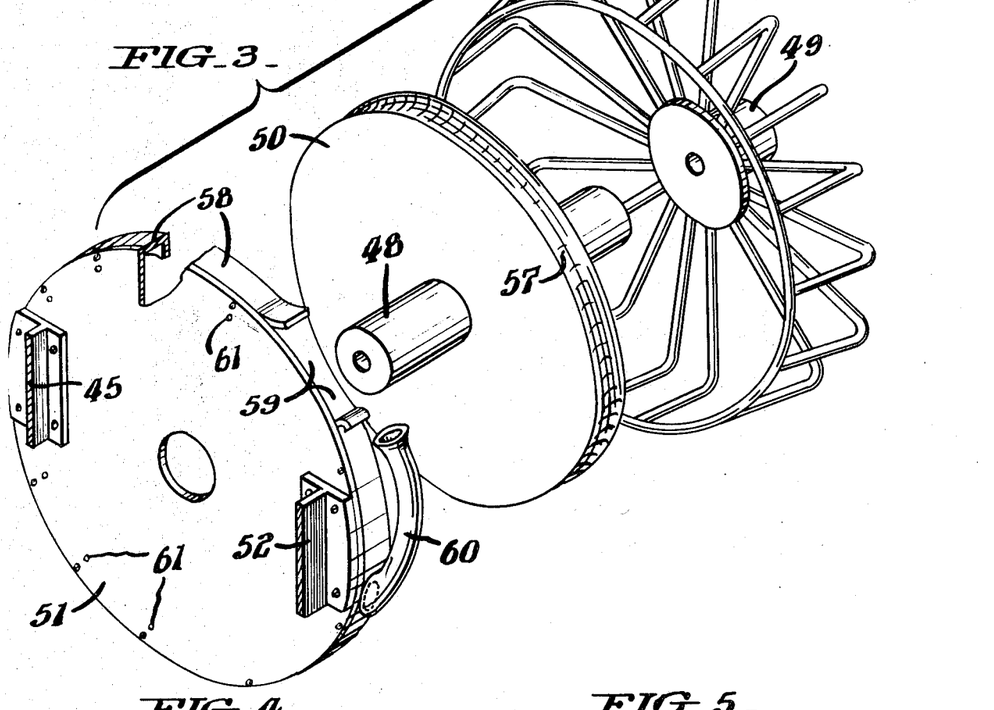
FIG. 3 is an exploded perspective view of the storage reel, the torsion-taking wheel and the confining guard.

The structure of one form of torsion-taking wheel 50 and cover guard 51 is illustrated in FIG. 3. The wheel 50 is illustrated as a solid disc, but could be a spoked wheel. The rim of wheel 50 is recessed peripherally, an arcuate recess 57 being illustrated in FIGS. 3 and 4. The guard 51 is illustrated as a cover disc having a peripheral L-shaped flange 58 which, when the cover disc is in place adjacent the wheel, extends laterally out over the rim of the wheel 50 and then downward toward the hub, as best seen in the cut-away portion of FIG. 3 and in cross-section in FIG. 4. Rollers 55 supported on studs 61 are provided at close equally-spaced intervals about the periphery of the cover guard 51. These rollers are not illustrated in FIG. 3 in order to simplify the illustration but are clearly illustrated in FIG. 4.

Figure 4:
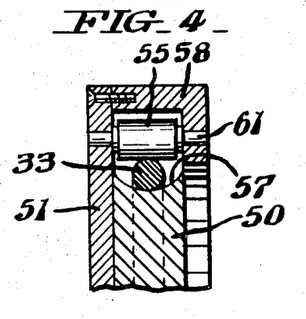
FIG. 4 is a detailed view in section along the line IV—IV of FIG. 2.

The continuous rodding 33 is passed around the periphery of the wheel 50 and is closely confined in the recess 57 by the rollers 55. To allow for the rodding 33 to enter and leave the rim of wheel 50, a gap is provided in the flange 58 as at 59.

A flared guide tube 60 is fixed to the flange 58 of the guard 51 for guiding the continuous rodding 33 from the storage reel 30 onto the peripheral recess 57 of the torsion-taking wheel 50. Tube 60, also, of course, guides the rodding from the wheel 50 to the storage reel 30 when the rodding is being returned to the reel. The flared end of the tube 60 fits within the cage of reel 30. The other end of tube 60 is secured to the center part of flange 58.

When the friction drive rollers 43 are driven in a direction to pull the continuous rodding 33 from the storage cage 30, the rodding 33 passes from the reel through the guide tube 60 and into the peripheral recess 57 of the wheel 50. As it passes around the rim of the wheel it is pressed into the recess 57 by the rollers 55 of the flanged guard 51. The rollers 55 thus confine the rodding 33 closely in the recess 57, yet allow the rodding to be pulled in its longitudinal direction without appreciable frictional opposition, since as the rodding is pulled, the rollers 55 rotate and the wheel 50 turns freely on its own axis, the recessed peripheral rim of wheel 50 moving with the rodding.

While the rodding 33, although confined closely in the curved peripheral recess 57 of wheel 50, is free to be pulled in either of its longitudinal directions without substantial frictional opposition, the confined rodding which curves about the wheel is not free to turn on its own axis, nor is it free to move laterally, being confined by the rollers 55 and the floor of the recess 57.

Consider now what happens when in the course of clearing an obstruction, the tool at the far end of the rodding is slowed down in its rotation by the obstruction. The frame 29 is rotating, carrying with it the reel 30 and wheel 50. The rodding 33 is being turned on its own axis, as it leaves the rodding machine, at a speed of rotation greater than that at which the tool end of the rodding is being permitted to turn. As a result, the rodding is subjected to a torsional stress or twisting, and this twisting, known as snaking or worming of the rodding, will, unless prevented, run back into the storage reel where it causes the coils of rodding to be distorted, tending to cause entanglement. The torsion-taking wheel 50 of the present invention, acts as a twist or snaking barrier, preventing the twist or snaking from running back beyond the wheel 50 into the storage reel. In summary, the closely confined rodding, curving about a major portion of the periphery of the wheel 50, is unable to twist or snake to any appreciable extent, and the twist or snaking is thereby prevented from running on back into the coiled rodding in the storage reel.

Figure 5:
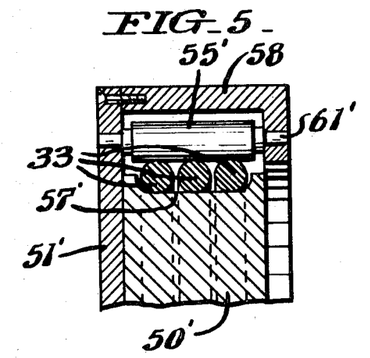
FIG. 5 is a view, in cross section, illustrating a wider form of torsion-taking wheel in which the peripheral recess is wide enough to receive three turns of the rodding about the wheel.

FIG. 5 illustrates a modification in which the wheel 50' is wider, having a recess 57' which is sufficiently wide to receive three turns of the rodding 33. Rollers 55' and the L-shaped flange 58' are correspondingly wider. This structural arrangement allows the rodding from the storage reel 30 to be wrapped several times around the wheel 50 before passing into the flared tube 39 (FIGS. 1 and 2) which guides the rodding into the trunnion tube 32 and to the friction drive 43, 44.

Figure 6:
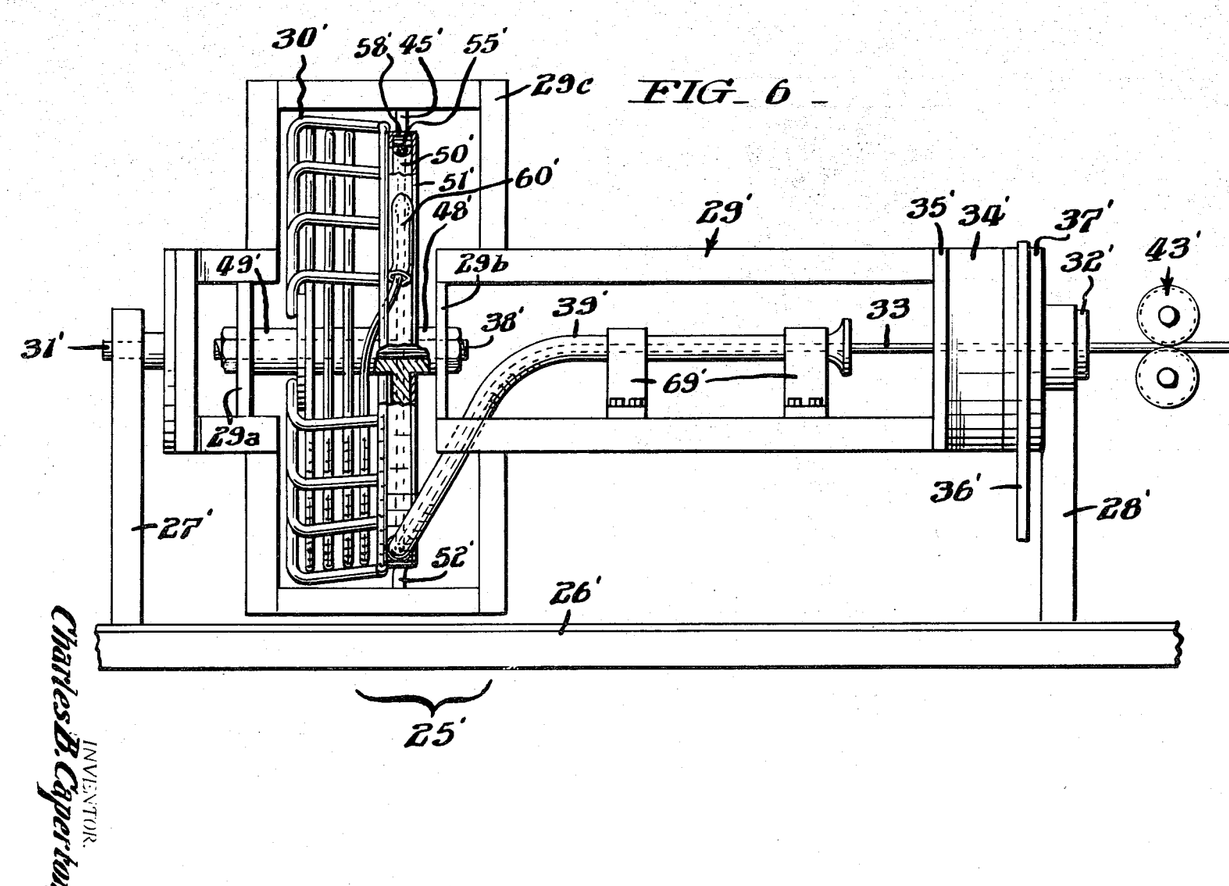
FIG. 6 is a side elevational view of another form of rodding machine employing the torsion-taking wheel.

FIG. 6 shows a rodding machine in which the storage reel and torsion-taking wheel are mounted at an angle (a right angle being illustrated) to the direction in which the continuous rodding 33 is pulled by the friction roller drive 43' as it is pulled from, or returned to, the rodding machine. In FIG. 6, the rotatable frame and the drive means for rotating the frame are generally similar to that of the machine of FIGS. 1 and 2, and similar reference numerals, with a prime added, are used to identify similar parts. The torsion-taking wheel 50' is mounted for free rotation on a sleeve 48' on a shaft 38' which is supported in frame 29' as by support members 29a and 29b. The flanged cover guard 51' for wheel 50' is fixed to the offset portion 29c of frame 29' as by brackets, such as 45' and 52'. The cover guard 51' has an L-shaped peripheral flange 58', rollers 55', and a guide tube 60' for guiding the rodding 33 from the storage reel 30' into the peripheral recess 57' of the wheel 50'. A second guide tube 39' has one end fixed to the flange of the cover guard 51', from which point the tube 39' extends forward and inward in a double curve terminating in a straight portion located on the axis of rotation of frame 29'. Tube 39' is supported in frame 29' as by the brackets 69'. The storage reel 30' is mounted for free rotation on a sleeve 49' supported on shaft 38' at the other end from sleeve 48'.

Figure 12:
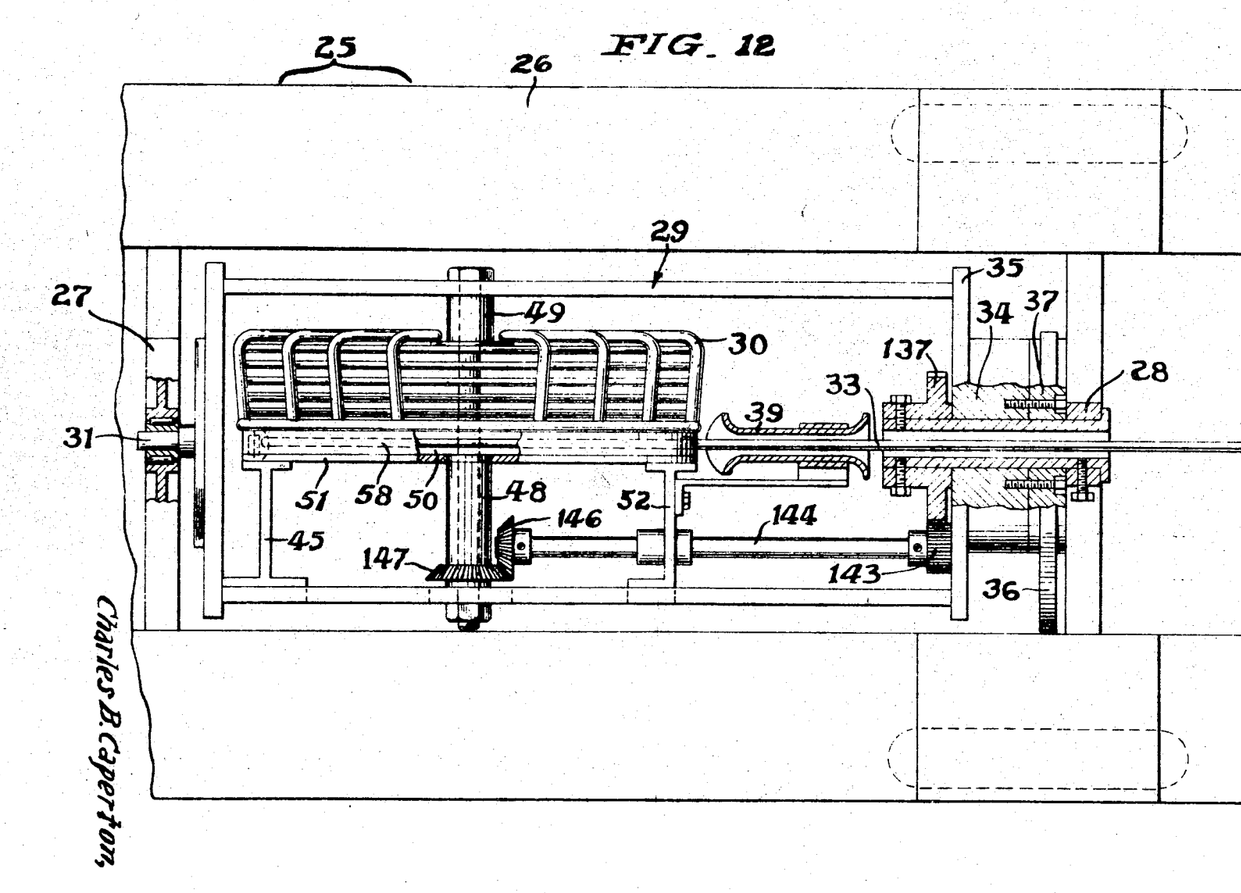
FIG. 12 is a plan view of a rodding machine generally similar to that of FIG. 1 but differing in that the torsion-taking wheel 50 is positively driven to effect a reaction type of drive for the continuous rodding.

FIG. 12 illustrates a rodding machine generally similar to that shown in FIG. 1 but differing in that means are provided for driving positively the torsion-taking wheel 50. Such drive means include the gear 137 which is fixed to the inward end of the tube 32. Observe that the tube 32 is fixed. It does not rotate with the frame 29. The gear 137 meshes with a sun gear 143 fixed to the end of a shaft 144, the center portion of which is journaled in a support bracket 52 secured to the frame 29. The one end of shaft 144 is secured to the end member 35 of the frame 29. At the other end of the shaft 144, there is secured a bevel gear 146 which meshes with a bevel gear 147 affixed to sleeve 48 to which the torsion-taking wheel 50 is fixed for rotation on shaft 38. Thus, when the frame 29 is driven rotationally, the sun gear 143 rotates about the fixed gear 137, and this causes shaft 144 to rotate, thereby driving rotationally the bevel gear 146, the bevel gear 147, the sleeve 48, and the torsion-taking wheel 50. When the wheel 50 is thus driven, reaction forces are set up which drive the rodding 33 either outwardly through the guide tube 39 or inwardly through the guide tube 60 (FIG. 3) according to the direction of rotation of the torsion-taking wheel 50.

In FIGS. 1–6, the rodding 33 is illustrated as continuous rodding, as distinguished from coupled rodding. The torsion-taking wheel may, however, be used in taking the torsional stress in coupled rod, as well as in continuous rod. While any known form of drive means may be employed to drive the coupled rod, I have illustrated in FIGS. 7–11 a form of chain belt drive which I provide and which is especially suited, in cooperation with the torsion-taking wheel, for driving coupled rod.

Referring now to FIGS. 7–11, the torsion-taking wheel 150 is provided at its periphery with a pair of upstanding flanges 151 and 152 forming therebetween a recess 153 for receiving the coupled rod 133 and the chain belt 160. Chain belt 160, as best seen in FIG. 6, is comprised of the usual links 157 and cross members 158. Dogs 159, having cross-channels on their undersurface, are secured as by screws to cross members 158 at regularly spaced intervals along the chain. While single dogs 159 may be used, I prefer to use the dogs in pairs, one each secured to adjacent cross members 158 at regular intervals along the chain belt. This facilitates driving the rod in both directions. The chain links 157 and the spacing between cross members 158 are so selected, relative to the spacing between the couplers 134 of the rodding 133, that the distance on the chain belt 160 between the inner faces of non-paired dogs 159 corresponds to the distance between successive couplers 134 on the rodding 133, and the spacing between the inner faces of dogs 159 of a pair is slightly greater than the length of a coupler 134. Thus, as the chain belt 160 is driven, as by the drive sprocket 161 fixed to the drive shaft 162, the dogs 159 ride on the rodding 133 and the forward face of one of the dogs of the pair engages the rearward end face of one of the couplers 134, thereby pushing the rodding along, in one direction or the other according to the direction of rotation of the drive sprocket 161.

Figures 7, 8, 9, 10, 11:
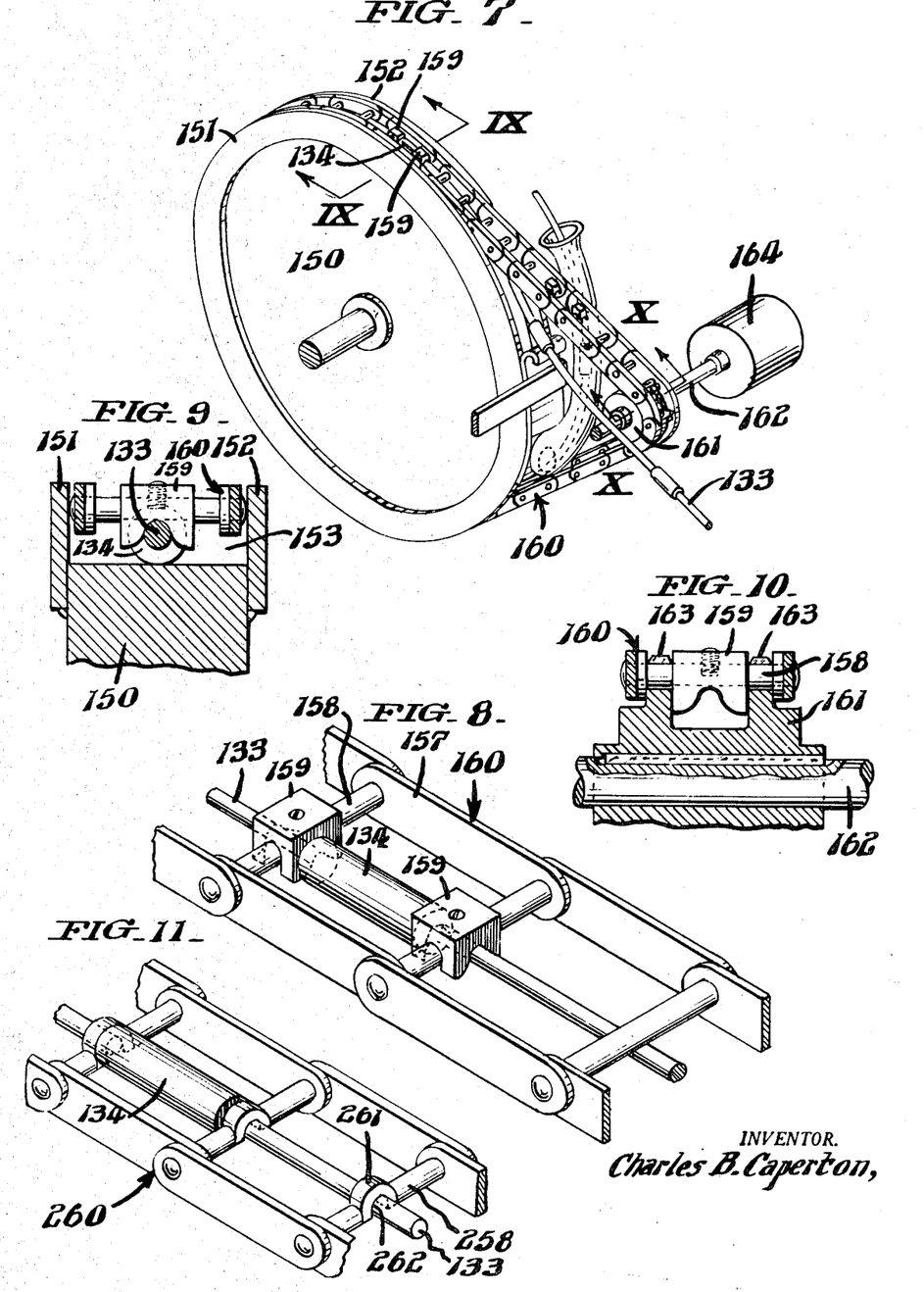
FIG. 7 is a perspective view illustrating a chain belt for driving coupled rodding, in which the chain belt embraces the periphery of the torsion-taking wheel.
FIG. 8 is an enlarged view of the chain belt.
FIG. 9 is a view in section along the line IX—IX of FIG. 7.
FIG. 10 is a view in section along the line X—X of FIG. 7.
FIG. 11 is an illustration of a modified form of chain belt.

FIG. 9 is a cross-sectional view taken along the line IX—IX of FIG. 7 illustrating how the channeled undersurface of the dog 159 fits on the rodding 133 and the face of the dog 159 engages the face of the coupler 134.

FIG. 10 is a cross-sectional view taken along the line X—X of FIG. 7 showing how the spaced-apart upstanding teeth 163 of the sprocket 161 engage the cross member 158 of the chain 160 on either side of the dog 159.

The drive shaft 162 may be driven by any suitable drive means. In FIG. 7, the drive shaft 162 is illustrated as driven by a motor 164 which may be either hydraulic or electric. The torsion-taking wheel 150 of FIG. 7 may be either a freely rotatable wheel or it may be fixed against rotation.

The chain belt form of drive illustrated in FIG. 7 may be mounted in the rotatable frame 29 of a rodding machine of the general form shown in FIGS. 1 and 2, in which case the friction roller drive 43, 44 is omitted. Drive motor 164 is preferably electric and suitable slip rings are provided for delivering the power to the motor 164 which, being mounted on frame 29, rotates therewith. Such slip rings may, for example, embrace the frame 29.

FIG. 11 illutrates a modified form of chain belt 260 in which the cross members 258 are provided with central arches 261, forming tunnels 262 for receiving the rodding 133. In such construction, the dogs 159 may be omitted since the arches 261 engage the rearward face of the couplers 134 and function to drive the rodding forward. In those installations where the chain 260 is to function merely as a hold-down means for confining the rod on the periphery of the wheel, the cross members 258 may be straight bars, without the arch portions 261.

The drive chains of FIGS. 8 and 11, if suitably tightened about the wheel 150, may also be used to drive continuous rodding by frictional engagement with the rodding; and either of the chains, or modifications thereof, may be used merely to confine the continuous rodding in the peripheral recess of the wheel 150, the drive for the rodding being provided by other known means.

Figure 13:
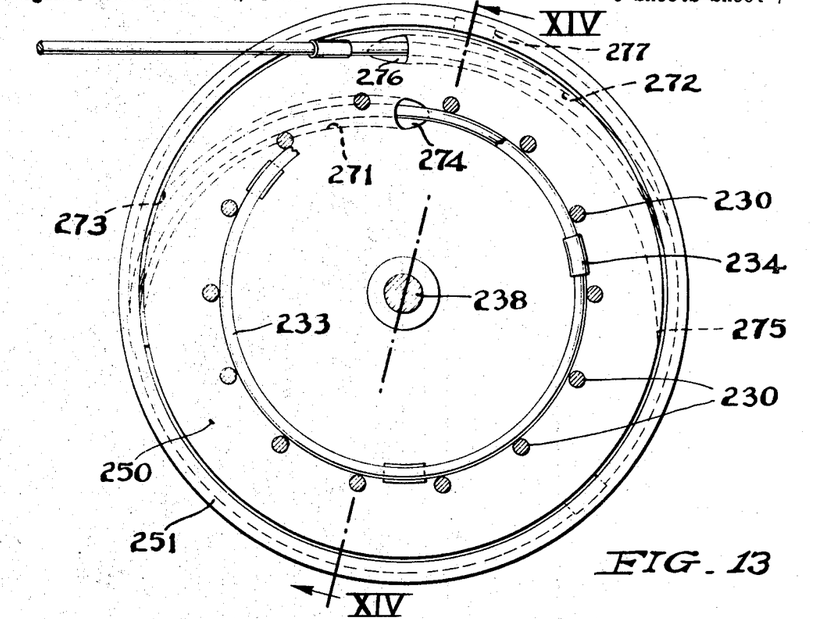
FIG. 13 is an elevational view of a portion of a modified form of rodding machine in which the torsion-taking wheel is stationary and the cover or guard is driven rotationally to drive positively the coupled rod.
Figure 14:
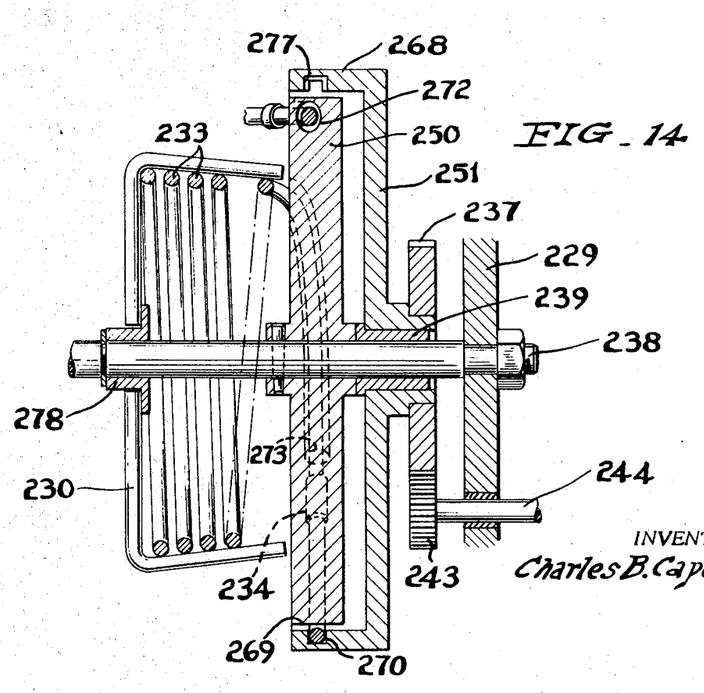
FIG. 14 is a front view of the apparatus of FIG. 13.

FIGS. 13 and 14 illustrate a modification in which the torsion-taking wheel 250 is stationary on a fixed shaft 238 supported in frame member 229. The fixed wheel 250 is provided with a rotatable cover 251. In FIG. 14, the cover 251 is illustrated as being driven by drive shaft 244, pinion 243 and gear 237. The gear 237 and cover 251 are shown supported on a sleeve bearing 239. Cover 251 has an inwardly-extending peripheral flange 268 which projects over the rim 269 of the fixed wheel 250. The undersurface of flange 268 is provided with a circumferential slot 270 for receiving the rod 233, and the slot 270 is provided at spaced intervals with rectangular recesses 277 for receiving the couplers 234 of the rod 233.

The cage reel 230, which is mounted on a hub 278 for free rotation on fixed shaft 238, has an outside diameter which is illustrated as smaller than the diameter of fixed wheel 250. To simplify the drawing, only one loop of rod 233 is seen in FIG. 13 but as indicated in FIG. 14, the cage reel 230 will ordinarily have a plurality of loops therein.

The fixed wheel 250 is provided with two slots 271 and 272. Slot 271 extends from a flared opening 273 in the rim 269 of the wheel 250 to a flared opening 274 in the side wall of the wheel 250 below the rim and within the diameter of the cage reel 230. The other slot 272 extends from a flared opening 275 in the rim 269 of the wheel 250 to a flared opening 276 in the side of the wheel below the rim 269 but outside the diameter of the reel 230.

To load the machine initially, the coupled rod 233 from outside the cage is threaded into the opening 276, through the slot 272, and on the rim of wheel 250 at the opening 275. The rod then follows along the rim of the wheel 250 for about 180°, and then enters the slot 271 at the opening 273. The rod passes through the slot 271 and emerges at the opening 274 in the side of the fixed wheel, within the diameter of the cage reel 230. In threading the rod 233 in the manner just described, the couplers 234 of the rod enter the rectangular recesses 277 of the cover 251.

It will be seen that when the cover 251 is driven in the clockwise direction, as viewed in FIG. 13, the coupled rod outside the machine will be pulled into the slot 272, around approximately 180° of the rim of the fixed wheel 250, into the slot 271 and into the cage reel 230. When, on the other hand, the cover 251 is driven in the counterclockwise direction, as viewed in FIG. 13, the coupled rod 233 will be pulled from its coiled position in the cage reel 230 out through the slot 271, onto the rim of the fixed wheel 250, and out through the slot 272, emerging at the flared opening 276 outside the diameter of the cage reel 230.

To turn the rod on its own axis for the purpose of turning the cutter or other tool at the forward end of the rod, the structure shown in FIGS. 13 and 14, i.e., the fixed wheel 250, the cover 251, and the cage reel 230, may be mounted for rotation in a frame 229 in a manner corresponding either to that shown in FIG. 1, wherein the wheel and cage occupy planes which are parallel to the direction of movement of the rod as it is driven into or is pulled out from the sewer or other conduit to be cleared, or corresponding to that shown in FIG. 6, wherein the wheel and cage occupy planes perpendicular to the direction of movement of the rod. In either case, as the wheel and cage structure is rotated to turn the rod on its own axis, to rotate the tool, the torsion or twist to which the rod is subjected is prevented from entering the cage reel 230 by the fixed torsion-taking wheel 250, to the rim 269 of which the rod 233 is confined by the flange 268 of the rotatable cover 251.

Figure 15:
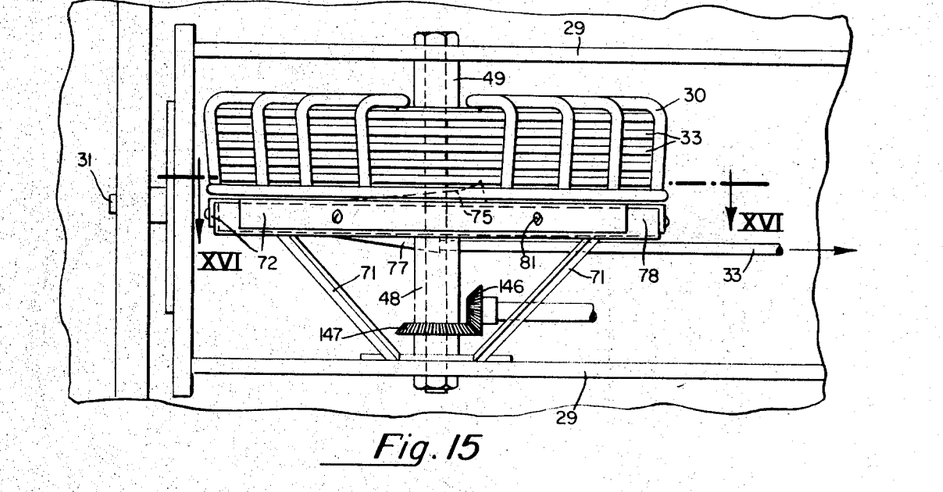
FIG. 15 is a plan view of a portion of a rodding machine generally similar to that of FIG. 12 but employing a freely-rotatable ring to confine the rod on the torsion-taking wheel.
Figure 16:
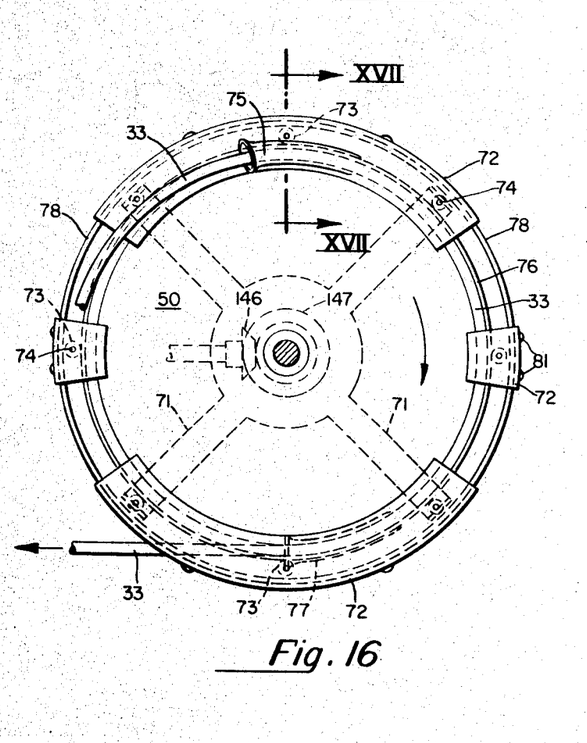
FIG. 16 is a view taken along the line XVI—XVI of FIG. 15.
Figure 17:
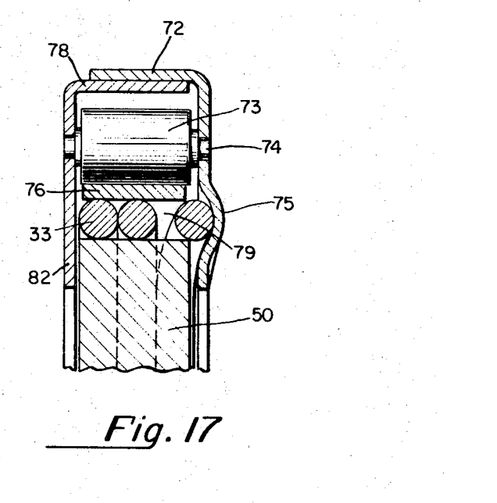
FIG. 17 is a view, in section, along the line XVII—XVII of FIG. 16.

FIGS. 15, 16 and 17 illustrate another form of rodding machine, generally similar to FIG. 12, but in which the periphery of the rotatable torsion wheel 50 is surrounded by a steel annular band or ring 76. The inside diameter or ring 76 is greater than the outside diameter of wheel 50 so that an annular space 79 is formed for receiving the rod 33. The rod 33 is delivered from cage 30 into the annular space 79 at the periphery of wheel 50 through a fixed guide tube or eye 75. Guide tube 75 is formed in and is an integral part of an arcuate retaining member 72, L-shaped in cross section, which is secured, as by screws 81, to the flanged portion 78 of the annular portion 82 of a spider 71 which is fixed mounted on the rotatable frame 29. Spider 71 may be generally similar to the spider (65) shown in FIGS. 12–13 of my Pat. 3,039,715. In FIG. 16, retaining member 72 is illustrated as being segmented, having an upper segment, a lower segment, and two side segments. Guide tube 75 is illustrated as being an integral part of the upper segment of retainer 72. If desired, retaining member 72 may be continuous or annular.

Wheel 50 may be driven rotationally, as by bevel gears 146 and 147, as in FIG. 12, or may be rotated by frictional engagement with rod 33 in response to the pull on the rod by an external drive means, such as drive means 43 in FIG. 1. In either case, the rod 33 during pay-out is guided from the cage 30 through the guide tube 75 into the annular space 79 at the periphery of wheel 50. The rod 33 leaves the space 79 on the opposite side of wheel 50 through guide tube 77 which is shown as being an integral part of the lower segment of retainer 72. The mouths of guide tubes 75 and 77 are at least 180° apart circumferentially and are located on opposite sides of the plane of the wheel 50 so that the rod 33 may be delivered from the space 79 on that side of the wheel 50 which is opposite to the cage 30.

Ring 76 is maintained concentric relative to wheel 50 by rollers 73. The ring 17 is free to rotate circumferentially as the rod 33 is pulled about the periphery of wheel 50, thereby keeping the frictional resistance to a minimum. The axles 74 of rollers 73 are supported on one side in spider 71 and on the other side in the annular retainer 72.

In FIG. 17, the rod 33 is shown to be wrapped several times about the wheel before leaving through the tube 77. The continuous annular band or ring 76 embraces the rod 33, so that the combination of ring 76 and wheel 50 functions as a torsion barrier. Where intended for use with rod 33 which is sectional, the periphery of wheel 50 is provided with slots at spaced intervals to receive the couplers. In such case, the slots extend across the full width of the rim of the wheel 50 to permit the coupled rod to enter on one side of the wheel and leave on the other.

FIGS. 18–21 illustrate another form of rodding machine structure generally similar to that shown in FIGS. 15 and 16, but in which that side of rotatable wheel 50 which faces the cage 30 is provided with an annular recess 91 which is spaced radially inwardly from the outer periphery of the wheel, forming the end portion identified as 94. The height of the recess 91 is made substantially equal to, or just slightly larger than, the diameter of the rod 33 so that the rod 33 may be force fitted thereinto, whereby the wheel 50 functions as an effective torsion barrier. Since the rod 33 and recessed wheel 50 are moving at the same speed, there is little or no frictional resistance between the rod 33 and the wheel 50.

The rod 33 is prevented from escaping laterally from recess 91 by a plurality of annular segments or arcuate retaining members 92 spaced about the periphery of the wheel 50. The retaining members 92 are secured, as by screws 93, to the annular rim portion 82 of a fixed spider which, though not shown in FIGS. 18–21, is similar to spider 71 of FIGS. 15 and 16.

The upper segment of retainer 92 includes, as an integral part thereof, a guide tube 95, while the lower segment of retainer 92 includes a similar guide tube 96 as an integral part of the lower segment. The mouths of the upper and lower guide tubes 95 and 96 are both on the cage side of the wheel 50, not on opposite sides of the plane of the wheel 50 as in FIGS. 15–16.

Figure 18:
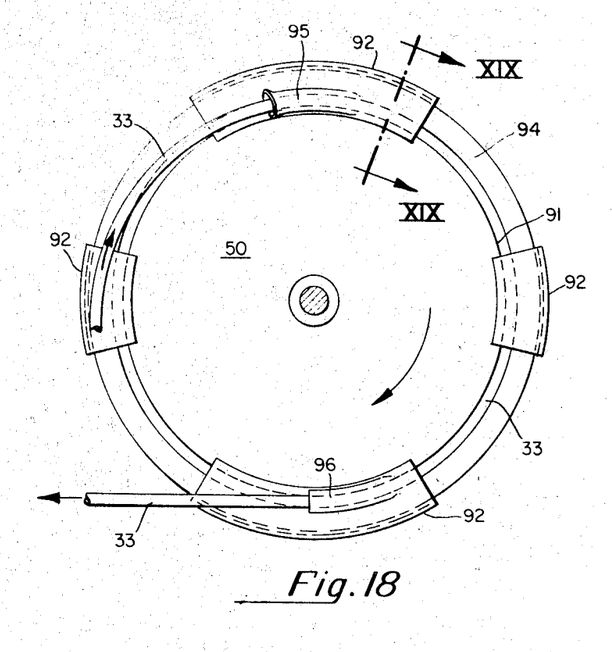
FIG. 18 is an elevation of yet another form of torsion-taking wheel.
Figure 19:
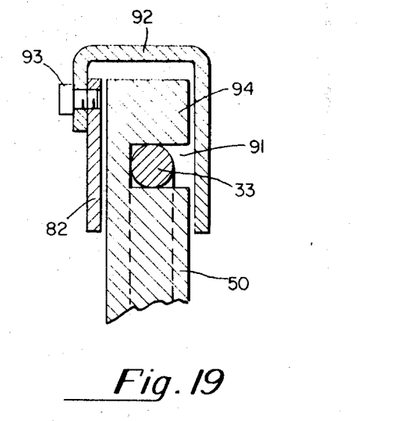
FIG. 19 is a view, in section, along the line XIX—XIX of FIG. 18.
Figure 20:
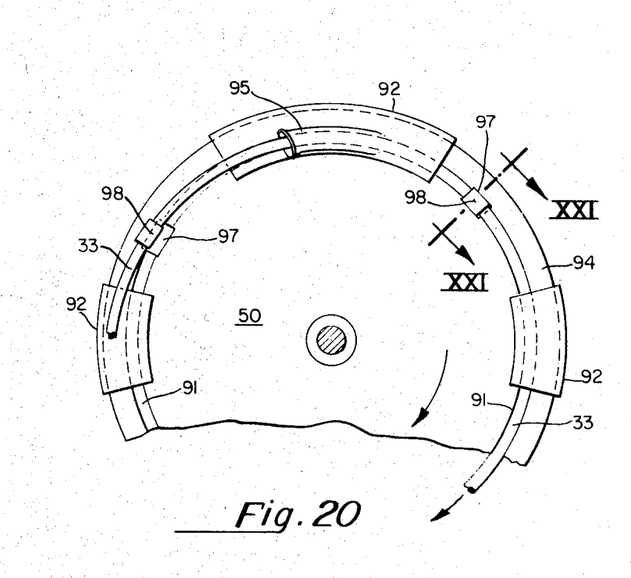
FIG. 20 is a view generally similar to FIG. 18 but in which the periphery of the torsion-taking wheel is provided with spaced slots for receiving the couplers of sectional rod.
Figure 21:
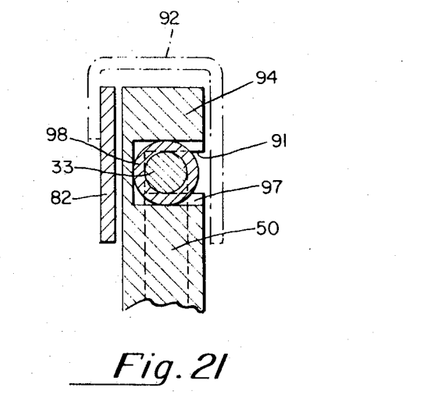
FIG. 21 is a view along the line XXI—XXI of FIG. 20.

The structure shown in FIGS. 20 and 21 is similar to that shown in FIGS. 18 and 19, except that in FIGS. 20 and 21 the recess 91 is provided, at spaced intervals, with enlarged recesses or slots 97 for receiving the couplers 98 of coupled rod 33.

In the structural arrangement of FIGS. 18–20, the rod 33, during pay-out is directed from the cage through guide tube 95 into the annular recess 91. It leaves the recess 91, at least 180 degrees later, through the guide tube 96. Sufficient space is provided between the wheel 50 and the cage to permit the rod to pass through on its way to or from the pipe which is to be cleared.

It is pointed out that while a torsion-taking wheel has been shown in many of the illustrations and that, when driven, the wheel has been shown as driven at its center axis or hub, the center or hub portion of the wheel is not an essential part of the torsion-taking structure. The wheel could, in many cases, be replaced by an annular structure generally like a ring gear, and such may be driven at its periphery as by a spur gear or pinion.

A variety of embodiments have been illustrated and described. Broadly speaking, the concept of the present application is to provide a torsion-taking structure which provides a confining region for the rod which is essentially tubular in cross section and which is circular or at least arcuate in the axial or lengthwise direction of the rod. In cross section, the confining tube has four boundaries, i.e., a top, a bottom, and two sides. At least one of these boundaries is usually fixed or stationary relative to the others to provide a fixed support for the guide eyes which guide the rod from the cage to the confining region and which guide the rod from the confining region toward the pipe to be cleared. Those boundaries which are not fixed are rotatable in the circumferential direction. The rotatable boundaries may be either driven, or may be merely idling members free to rotate. The confining or torsion taking chamber may be large enough in cross section to take coupled rod as well as continuous rod, without preventing the torsion-taking function from being performed.

While the preferred embodiments of this invention have been described in some detail, it will be obvious to one skilled in the art that various modifications may be made without departing from the invention as hereinafter claimed.

Having described my invention, I claim:

1. In a rodding machine for clearing obstructions in sewers and the like; a base structure; a rotatable frame mounted for rotation in said base structure; a storage reel for the rod mounted for rotation in said frame for rotating the rod axially, said rotating rod during clearing of obstruction operations being subject to torsional stress and twisting; and twist barrier means mounted near to said storage reel for preventing the twisting of the rod from being transferred into said storage reel, said twist barrier means comprising an annular surface supported in said frame adjacent said storage reel, guide means for guiding said rod to said annular surface, and means for confining said rod on at least a portion of said annular surface as said rod is pulled from and returned to said storage reel, said confining means comprising peripheral means closely embracing the rod on at least a portion of said annular surface, and including a fixed guard provided with cross rollers at spaced intervals for engagement with said confined rod to facilitate movement of said rod in its axial direction while substantially opposing movement in the radial and circumferential directions of said confined rod.

2. In a rodding machine according to claim 1 further characterized in that said annular surface comprises the rim of a torsion-taking wheel disposed in a plane substantially parallel to that of said storage reel, and which is also in the plane of the rod as it moves from the rodding machine toward the obstruction to be cleared.

3. In a rodding machine according to claim 1 characterized in that said annular surface comprises the rim of a torsion-taking wheel disposed in the plane substantially parallel to that of said storage reel but at an angle relative to the direction in which said rod moves as it is withdrawn from or returned to said rodding machine.

4. In a rodding machine according to claim 1 characterized in that said annular surface includes an annular recess in a torsion-taking wheel, and further characterized in that said confining means is fixed supported on said frame and in that said guide means is supported by said confining means.

No references cited.

EDWARD L. ROBERTS, Primary Examiner

U.S. Cl. X.R.

242—54